(12) United States Patent
Lee et al.

(10) Patent No.: US 10,769,745 B2
(45) Date of Patent: Sep. 8, 2020

(54) THREE-DIMENSIONAL MESH MODEL WATERMARKING METHOD USING SEGMENTATION AND APPARATUS THEREOF

(71) Applicant: Korea Advanced Institute of Science and Technology, Daejeon (KR)

(72) Inventors: Heung-Kyu Lee, Daejeon (KR); Han-Ul Jang, Daejeon (KR); Hak-Yeol Choi, Daejeon (KR); Jeongho Son, Daejeon (KR); Seung-Min Mun, Daejeon (KR); Dongkyu Kim, Daejeon (KR); Jong-Uk Hou, Daejeon (KR); Wookhyung Kim, Daejeon (KR)

(73) Assignee: The Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/387,121

(22) Filed: Dec. 21, 2016

(65) Prior Publication Data

US 2017/0213310 A1  Jul. 27, 2017

(30) Foreign Application Priority Data

Jan. 27, 2016 (KR) .................. 10-2016-0010324
Nov. 29, 2016 (KR) .................. 10-2016-0159936

(51) Int. Cl.
*G06T 1/00* (2006.01)
*G06T 7/10* (2017.01)
(Continued)

(52) U.S. Cl.
CPC .............. *G06T 1/0021* (2013.01); *G06T 7/10* (2017.01); *G06T 7/60* (2013.01); *G06T 17/10* (2013.01); *G06T 17/205* (2013.01)

(58) Field of Classification Search
None
See application file for complete search history.

(56) References Cited

FOREIGN PATENT DOCUMENTS

| CN | 101533509 A | 9/2009 |
|---|---|---|
| CN | 102622721 A | 8/2012 |

(Continued)

OTHER PUBLICATIONS

Cho, Jae-Won, Rmy Prost, and Ho-Youl Jung. "An oblivious watermarking for 3-D polygonal meshes using distribution of vertex norms." IEEE Transactions on Signal Processing 55.1 (2007): 142-155.*

(Continued)

*Primary Examiner* — Vu Le
*Assistant Examiner* — Tracy Mangialaschi
(74) *Attorney, Agent, or Firm* — Peter A. Sullivan; Erik A. Huestis; Foley Hoag LLP (57) ABSTRACT

Disclosed is a 3D mesh model watermarking method using a divisional scheme. The method of inserting a watermark into a three-dimensional (3D) mesh model includes: calculating a geometric primitive of the 3D mesh model; dividing the 3D mesh model into a plurality of mesh segments by using the geometric primitive; converting the mesh segments into mesh segments of a vertex distance-based coordinate system; inserting a predetermined watermark into each of the mesh segments of the vertex distance-based coordinate system; and restoring the mesh segments into which the watermark is inserted to a Cartesian coordinate system.

12 Claims, 6 Drawing Sheets

(51) Int. Cl.
  *G06T 17/10* (2006.01)
  *G06T 7/60* (2017.01)
  *G06T 17/20* (2006.01)

(56) References Cited

FOREIGN PATENT DOCUMENTS

| | | |
|---|---|---|
| CN | 103247017 A | 8/2013 |
| CN | 104281994 A | 1/2015 |
| KR | 20090091575 A | 8/2009 |

OTHER PUBLICATIONS

Tsai, Jen-Sheng, et al. "Geodesic-based robust blind watermarking method for three-dimensional mesh animation by using mesh segmentation and vertex trajectory." Acoustics, Speech and Signal Processing (ICASSP), 2012 IEEE International Conference on. IEEE, 2012.*

Alface, Patrice Rondao, Benoit Macq, and François Cayre. "Blind and robust watermarking of 3D models: How to withstand the cropping attack'?." Image Processing, 2007. ICIP 2007. IEEE International Conference on. vol. 5. IEEE, 2007.*

Ashourian, Mohsen, Reza Enteshari, and Jeonghee Jeon. "Digital watermarking of three-dimensional polygonal models in the spherical coordinate system." Computer Graphics International, 2004. Proceedings. IEEE, 2004.*

Wang, Kai, et al. "Robust and blind mesh watermarking based on volume moments." Computers & Graphics 35.1 (2011): 1-19.*

Attene, Marco, Bianca Falcidieno, and Michela Spagnuolo. "Hierarchical mesh segmentation based on fitting primitives." The Visual Computer 22.3 (2006): 181-193.*

Feng, X. Q., and Yanan Liu. "A robust, blind and imperceptible watermarking of 3D mesh models base on redundancy information." Int J Digital Content Technol Appl 6.2 (2012): 172-179.*

Hassan, Sahar, Franck Hétroy, and Olivier Palombi. "Ontology-guided mesh segmentation." FOCUS K3D Conference on Semantic 3D Media and Content, FOCUS K3D, Feb. 2010, Sophia Antipolis, France. pp. 5. (Year: 2010).*

Bénière, Roseline, et al. "Recovering primitives in 3D CAD meshes." Three-Dimensional Imaging, Interaction, and Measurement. vol. 7864. International Society for Optics and Photonics, 2011. (Year: 2011).*

Feng, Xiaoqing, Yanan Liu, and Lincong Fang. "Digital watermark of 3D CAD product model." Int. J. Secur. Its Appl 9 (2015): 305-320. (Year: 2015).*

Motwani, M. C. (2011). Third generation 3D watermarking: applied computational intelligence techniques (Doctoral dissertation). (Year: 2011).*

Chen et al., "GPU-accelerated blind and robust 3D mesh watermarking by geometry image," Multimed Tools Appl, 75(16):10077-10096 (2016).

Cho et al., "An oblivious watermarking for 3-D polygonal meshes using distribution of vertex norms," IEEE Transactions on Signal Processing, 55(1):142-155 (2007).

Shapira et al., "Consistent mesh partitioning and skeletonisation using the shape diameter function," Visual Comp, 24:249-259 (2008).

'A Robust 3D Mesh Watermarking Scheme Against Cropping,' Seung-Min Mun et al., School of Computing Korea Advanced Institute of Science and Technology, presented at the 2015 International Conference on 3D Imaging, Dec. 14, 2015.

Nakazawa et al., "A Visually Enhanced Approach to Watermaking 3D Models," 2010 Sixth International Conference on Intelligent Information Hiding and Multimedia Signal Processing, IEEE, 110-113 (2010).

* cited by examiner

$\text{While}(\text{mean}[V_{i,j}] < 0.5 + \alpha):$
$k = k - \triangle k$
$V_{i,j} = \{ v^k \mid v \in V_{i,j} \}$
endwhile (a)

$\text{while}(\text{mean}[V_{i,j}] > 0.5 - \alpha):$
$k = k + \triangle k$
$V_{i,j} = \{ v^k \mid v \in V_{i,j} \}$
endwhile (b)

THREE-DIMENSIONAL MESH MODEL WATERMARKING METHOD USING SEGMENTATION AND APPARATUS THEREOF

CROSS-REFERENCE TO RELATED APPLICATIONS

This application claims priority under 35 U.S.C. § 119 to Korean Patent Application No. 10-2016-0010324, filed Jan. 27, 2016, and Korean Patent Application No. 10-2016-0159936, filed Nov. 29, 2016, the entire contents of which are hereby incorporated by reference.

BACKGROUND

Embodiments of the inventive concept described herein relate to a three-dimensional mesh model watermarking technique, and more particularly, relate to a three-dimensional mesh model watermarking method capable of inserting or detecting a watermark even when a 3D mesh model is divided, partially modified, or cut by using segmentation, and an apparatus thereof.

As the 3D print market has expanded and a 3D model edit tool has been developed, a 3D model has been frequently shared through Internet. However, since the 3D model that is a digital work is easily stored or modified due to the characteristics thereof, the 3D model may be copied without any limitations and illegally distributed. Thus, a method of protecting literary property of the 3D model is required.

A traditional encryption method may protect a digital work until it is decrypted. However, if decrypted once, it is impossible to protect data.

Digital watermarking is a copyright protection technique for compensating the defect of an encryption method. The digital watermarking inserts a specific data pattern into a digital work and detects it to certify the copyright.

Although there are many digital watermarking methods for protecting the copyright of a 3D model, since conventional methods insert a watermark into the entire region of the 3D model, when the 3D model is divided, cut, or copied and pasted, a synchronization error occurs so that it is impossible to detect the watermark.

In addition, since processes of dividing, cutting, and copying and pasting a 3D model easily occur, there is a need to a 3D model watermarking method capable of protecting a 3D model.

SUMMARY

Embodiments of the inventive concept provide a watermarking method capable of dividing a three-dimensional (3D) mesh model to insert and detect a watermark, and an apparatus thereof.

Embodiments of the inventive concept provide a watermarking method capable of inserting and detecting a watermark robust against partial modification of a 3D mesh model such as division, cutting, copy and paste, and the like, and an apparatus thereof.

Embodiments of the inventive concept provide a watermarking method capable of detecting a watermark without an original work.

According to one aspect of an embodiment, a method of inserting a watermark into a three-dimensional (3D) mesh model includes: calculating a geometric primitive of the 3D mesh model; dividing the 3D mesh model into a plurality of mesh segments by using the geometric primitive; converting the mesh segments into mesh segments of a vertex distance-based coordinate system; inserting a predetermined watermark into each of the mesh segments of the vertex distance-based coordinate system; and restoring the mesh segments into which the watermarks are inserted to a Cartesian coordinate system.

The inserting of the watermark may include: setting a watermark inserting section in each of the mesh segments of the vertex distance-based coordinate system; and inserting the watermark into the watermark inserting section set in each of the mesh segments of the vertex distance-based coordinate system.

The setting of the watermark inserting section may include setting the watermark inserting section of a predetermined interval by histogramming each of the mesh segments.

The dividing of the 3D mesh model may include dividing the 3D mesh model into the mesh segments by using a clustering method after calculating the geometric primitive of the 3D mesh model.

According to another aspect of an embodiment, a method of detecting a watermark in a three-dimensional (3D) mesh model includes: calculating a geometric primitive of the 3D mesh model; dividing the 3D mesh model into a plurality of mesh segments by using the geometric primitive; converting the mesh segments into mesh segments of a vertex distance-based coordinate system; detecting a watermark in each of the mesh segments of the vertex distance-based coordinate system; and determining a final watermark based on the watermark detected in each of the mesh segments.

The detecting of the watermark may include: setting a watermark detecting section in each of the mesh segments of the vertex distance-based coordinate system; and detecting the watermark in the watermark detecting section set in each of the mesh segments of the vertex distance-based coordinate system.

The setting of the watermark detecting section may include setting the watermark detecting section of a predetermined interval by histogramming each of the mesh segments.

The dividing of the 3D mesh model may include dividing the 3D mesh model into the mesh segments by using a clustering method after histogramming the geometric primitive of the 3D mesh model.

The determining of the final watermark may include determining, as the final watermark, one selected from the watermarks detected from the mesh segments by using a watermark trace analysis method or a majority voting system.

According to still another aspect of an embodiment, an apparatus for inserting a watermark into a three-dimensional (3D) mesh model includes: a calculation unit configured to calculate a geometric primitive of the 3D mesh model; a division unit configured to divide the 3D mesh model into a plurality of mesh segments by using the geometric primitive; a conversion unit configured to convert the mesh segments into mesh segments of a vertex distance-based coordinate system; an insertion unit configured to insert a predetermined watermark into each of the mesh segments of the vertex distance-based coordinate system; and a restoration unit configured to restore the mesh segments into which the watermarks are inserted to a Cartesian coordinate system.

The insertion unit may set a watermark inserting section in each of the mesh segments of the vertex distance-based coordinate system, and may insert the watermark into the watermark inserting section set in each of the mesh segments of the vertex distance-based coordinate system.

The insertion unit may set the watermark inserting section of a predetermined interval by histogramming each of the mesh segments.

The division unit may divide the 3D mesh model into the mesh segments by using a clustering method after calculating the geometric primitive of the 3D mesh model.

According to still another aspect of an embodiment, an apparatus for detecting a watermark in a three-dimensional (3D) mesh model includes: a calculation unit configured to calculate a geometric primitive of the 3D mesh model; a division unit configured to divide the 3D mesh model into a plurality of mesh segments by using the geometric primitive; a conversion unit configured to convert the mesh segments into mesh segments of a vertex distance-based coordinate system; a detection unit configured to detect a watermark in each of the mesh segments of the vertex distance-based coordinate system; and a determination unit configured to determine a final watermark based on the watermark detected in each of the mesh segments.

The detection unit may set a watermark detecting section in each of the mesh segments of the vertex distance-based coordinate system, and detects the watermark in the watermark detecting section of each of the mesh segments of the vertex distance-based coordinate system.

The detection unit may set the watermark detecting section of a predetermined interval by histogramming each of the mesh segments.

The division unit may divide the 3D mesh model into the mesh segments by using a clustering method after calculating the geometric primitive of the 3D mesh model.

The determination unit may determine, as the final watermark, one selected from the watermarks detected from the mesh segments by using a watermark trace analysis method or a majority voting system.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter embodiments of the inventive concept will be described in detail with reference to the accompanying drawings. However, it should be understood that the inventive concept is not limited to the following embodiments. In addition, the same reference numerals used in each drawing represent the same elements.

The gist of embodiments of the inventive concept is that a three-dimensional (3D) mesh model is divided to insert and detect a watermark, so that the watermark robust against partial modification of the 3D mesh model such as division, cutting, copy and paste, and the like may be inserted and detected.

The 3D mesh model is utilized in various fields such as a computer-aided design field, a 3D print field, etc. The 3D mesh model is generated in combination of elements such as a vertex, an edge, a face, a polygon, a surface, and the like.

The 3D mesh model may be generated through file conversion in a 3D voxel model.

Figure 1:
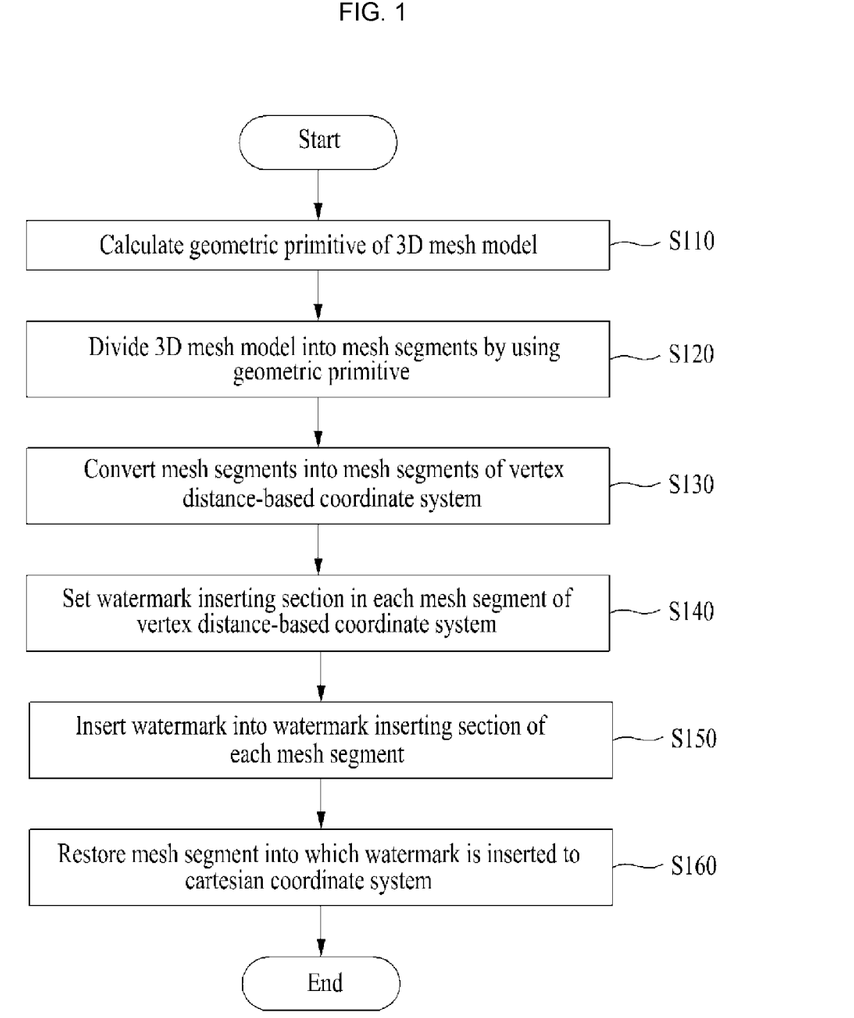
FIG. 1 is a flowchart illustrating a method of inserting a 3D mesh model watermark according to an embodiment of the inventive concept.

FIG. 1 is a flowchart illustrating a method of inserting a 3D mesh model watermark according to an embodiment of the inventive concept.

Referring to FIG. 1, in steps S110 and S120, a method of inserting a 3D mesh model watermark according to an embodiment of the inventive concept calculates a geometric primitive of the 3D mesh model, and divides the 3D mesh model into a plurality of mesh segments by using the calculated geometric primitive.

Figure 2:
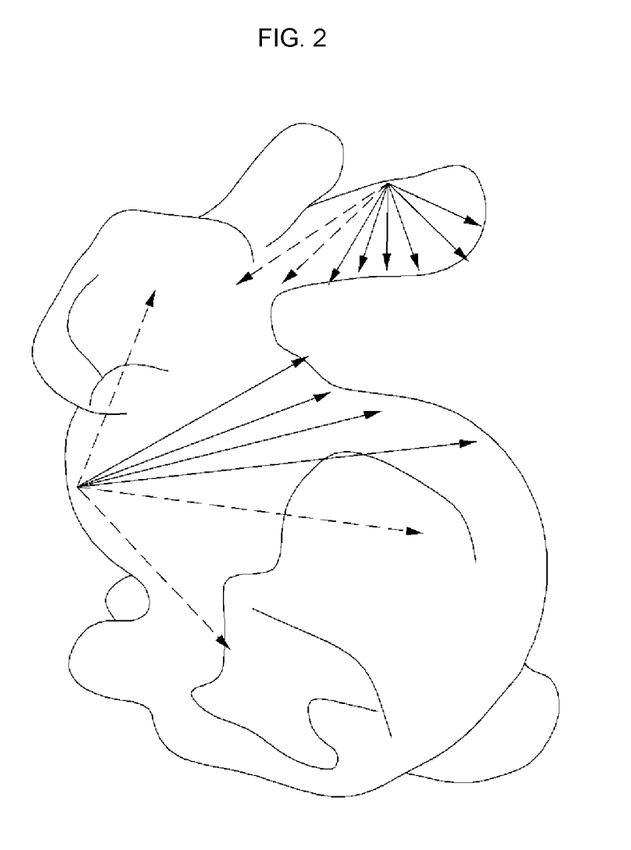
FIG. 2 is a view illustrating one example of the calculation of a geometric diameter value of a triangular face of a 3D mesh model.

In step S110, a shape diameter value of a triangular face of the 3D mesh model may be used as a geometric primitive. As one example, the shape diameter value is illustrated in FIG. 2.

The shape diameter value represents a length of a straight line which is drawn inwardly of a mesh model and perpendicularly from one point on one triangular face to another triangular face. To more precisely calculate the shape diameter value, by changing the angle of the straight line in the range of allowable angles inwardly of and perpendicularly to the mesh model in a cone shape, the shape diameter values may be calculated at the predetermined number of angles. A representative shape diameter value may be obtained by averaging the shape diameter values at the angles of one triangular face. The green line depicted in FIG. 2 represents a geometric diameter line within allowable angles and the red line represents a geometric diameter line beyond the allowable angles. The geometric diameter line may be normalized into a predetermined range of [0, 1].

In step S120, after the geometric primitive is calculated, the 3D mesh model is divided into the mesh segments by using a clustering method.

In this case, the clustering method includes a Gaussian mixture model. The Gaussian mixture model may be defined in linear combination of G probability density functions, where the mesh model may be divided into mesh segments having a smaller size as 'G' increases. The probability density function of the Gaussian mixture model may be expressed as following Equation 1.

$$p(x\mid\theta)=\sum_{i=1}^{G}p(x\mid\omega_i,\theta_i)P(\omega_i) \quad \text{[Equation 1]}$$

Where $p(x|\omega_i,\theta_i)$ represents a probability density function constituting a basic component of the mixture model, $\theta_i$ is a parameter defining the probability density function of the i-th component and, in the case of a Gaussian probability density function, is an average covariance matrix, $\omega_i$ is a random variable representing the i-th component, and $P(\omega_i)$ is relative importance of the i-th component occupying in the whole mixture probability density function and should meet the property expressed as following Equation 2.

$$0 \leq P(\omega_i) \leq 1, \sum_{i=1}^{G} P(\omega_i) = 1 \qquad \text{[Equation 2]}$$

In advance, in the embodiment, to divide the 3D mesh model into a plurality of mesh segments, a geometric primitive, which may be calculated every point and face of a mesh, may be used.

The geometric primitive, which may be used in step S110, may include at least one among several types of planarities, similarity with main figures such as a sphere, a cylinder, or a cone, a degree of a variation of a dihedral angle or a normal vector, a curvature, symmetry (slippage) to a rotational movement or a location movement, a geodesic distance, symmetry between meshes, convexity, a central axis, and a motional property of mesh animation.

To divide the 3D mesh model into mesh segments by using the geometric primitives calculated in step S120, a region growing algorithm, a hierarchical clustering algorithm, an iterative clustering algorithm, a spectral analysis algorithm, a boundary line setting algorithm, a top-down method, an induction algorithm, etc., may be used.

The region growing is a method that starts from a plurality of seeds and progressively enlarges a region, wherein the region is enlarged by including neighboring points having similar geometric primitives.

The hierarchical clustering is a method of merging clusters having similar geometric primitives.

The iterative clustering is a method of 1) grouping points corresponding to a model and 2) correcting the model based on the grouping result after setting up the model, such that an exact group model and result are obtained. The procedures 1) and 2) are repeated so that a correct group model and result are obtained.

The spectral analysis is a method of dividing a mesh through some algebraic operations after converting the mesh into a matrix.

The boundary line setting is a method of indirectly obtaining parts of a segment by first setting a boundary of segmentation.

The top-down method is a method of dividing a cluster into segments having certainly different geometric primitives on the contrary to the hierarchical clustering.

The induction is a method of first calculating a frame of a mesh and then, dividing each part by using the same.

In steps 130 and 140, when the 3D mesh model is divided into the mesh segments in step S120, the mesh segments are converted into mesh segments of a vertex distance-based coordinate system and a watermark inserting section is set in each of the mesh segments of the vertex distance coordinate system to insert the watermark thereinto.

The vertex distance is a distance between an origin point and a vertex. As the vertex distance-based coordinate system, a spherical coordinate system or a cylindrical coordinate system may be used. In addition, according to an embodiment of the inventive concept, all coordinate systems including the vertex distance as an element of a coordinate system may be used.

Coordinates of the spherical coordinate system are denoted as (r,θ,ψ), where 'r' represents a distance from an origin point to a vertex, 'θ' is an angle between the zenith direction from the Z-axis and a straight line from the origin point, and 'ψ' is the signed angle from the X-axis to the orthogonal projection of the straight line onto the XY-plane.

In this case, for example, L mesh segments may be transformed from a Cartesian coordinate system to a spherical coordinate system as following Equation 3.

$$r_{l,n} = \sqrt{(x_{l,n} - x_{l,g})^2 + (y_{l,n} - y_{l,g})^2 + (z_{l,n} - z_{l,g})^2} \qquad \text{[Equation 3]}$$

$$\theta_{l,n} = \arccos \frac{(z_{l,n} - z_{l,g})}{r_{l,n}}$$

$$\psi_{l,n} = \arctan \frac{(y_{l,n} - y_{l,g})}{(x_{l,n} - x_{l,g})}$$

Wherein $(x_{l,g}, y_{l,g}, z_{l,g})$ may represent a mass center of the l-th mesh segment, and $(x_{l,n}, y_{l,n}, z_{l,n})$ may represent the n-th vertex coordinates of the l-th mesh segment.

Coordinates of the cylindrical coordinate system may be denoted as (ρ, φ, z), where 'ρ' represents a distance from an origin point to a vertex, 'φ' is the signed angle from the X-axis to the orthogonal projection of the straight line onto the XY-plane, and 'z' represents a distance from the XY-plane to the vertex in the Z-axis direction.

In the step S140, for example, each of L mesh segments may be histogrammed to set the watermark inserting section having a predetermined interval.

In step S140, 'r' of each mesh segment may be histogrammed. 'r' histograms may be divided by the predetermined number of sections, which is equal to or greater than a length of a watermark character string to be inserted, for example, a predetermined interval of M, where the range of 'r' may be normalized into a predetermined range such as [0, 1] or [−1, 1]. A watermark character string is inserted only into a section preset among M sections having the predetermined interval and this section is the watermark inserting section.

In this case, the watermark character string may include a bit, an arbitrary numerical value, a character, and the like.

When the watermark inserting sections are set in the mesh segments in the step S140, respectively, a watermark is inserted into each of the watermark inserting sections set in the mesh segments and the mesh segments into which the watermark is inserted are restored to a Cartesian coordinate system in steps S150 and S160.

Figure 3:
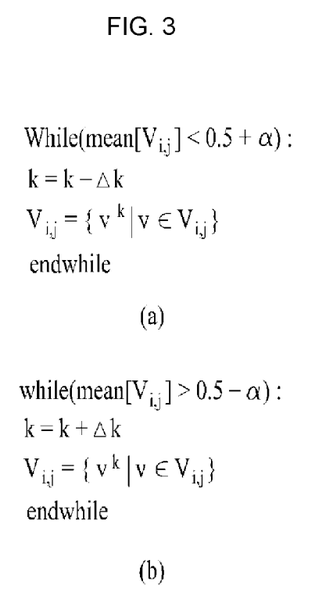
FIG. 3 is a view illustrating examples of an algorithm of inserting the first character of a watermark character string and an algorithm of inserting the second character of the watermark character string.

In this case, in step S150, one character of the watermark character string to be inserted may be inserted into each of the watermark inserting sections set in step S140. Two kinds of characters may be used as the watermark character string. An algorithm for inserting the first character of the watermark character string may be shown in FIG. 3A. An algorithm for inserting the second character of the watermark character string may be shown in FIG. 3B.

In FIG. 3, 'υ' represents a vertex and 'k' represents a parameter for changing a vertex where the parameter determines how long to allow a vertex to move through one loop. Although the inserting speed is increased as 'k' increases, the non-visibility may be deteriorated. In addition, 'α' represents watermark inserting intensity and may determine how long to allow a vertex to move when the insertion of the watermark is completed. Although the strength is increased as 'α' increases, the non-visibility may be deteriorated. $V_{l,m}$ may represent the m-th section of the l-th mesh segment.

The same watermark character strings are inserted into the mesh segments through step S150, respectively.

Furthermore, according to an embodiment of the inventive concept, in step S150 of inserting the watermark character string, a section statistic value such as an average, variance, a standard deviation, a gradient, a covariance, a correlation coefficient, etc. of each section, may be used.

When the value of 'r' of each section is normalized, the section statistic value has a uniform numeral value. For example, when the range of a value of 'r' of each section may be normalized into [−1, 1], the variance may approximate to ⅓. Thus, the watermark may be inserted by increasing or decreasing the variance.

The first character of the watermark character string may be inserted by increasing the statistic value of each section. The second character of the watermark character string may be inserted by decreasing the section statistic value of each section. When the watermark is inserted, the section statistic value moves as much as watermark insertion intensity α.

When the watermark is inserted into each of the mesh segments in step S150, the mesh segments may be restored to the Cartesian coordinate system (x, y, z) in step S160. If the mesh segments, into which the watermark is inserted, belong to the spherical coordinate system, the mesh segments of the spherical coordinate system may be restored to Cartesian coordinate system (x, y, z) as following Equation 4.

$$x'_{l,n} = r'_{l,n} \cos \theta_{l,n} \sin \psi_{l,n} + x_{l,g}$$

$$y'_{l,n} = r'_{l,n} \sin \theta_{l,n} \sin \psi_{l,n} + y_{l,g}$$

$$z'_{l,n} = r'_{l,n} \cos \psi_{l,n} + z_{l,g} \quad \text{[Equation 4]}$$

Wherein $(x'_{l,n}, y'_{l,n}, z'_{l,n})$ is the coordinates of the n-th vertex of the l-th mesh segment into which the watermark is inserted, 'r'' represents a distance between a vertex into which the watermark is inserted and the origin point, and 'r' represents a distance between a vertex into which any watermarks are not inserted and the origin point.

As described above, the method of inserting a watermark according to an embodiment of the inventive concept may divide a 3D mesh model into a plurality of mesh segments and then, may convert the mesh segments into coordinates of a vertex distance-based coordinate system to insert the watermark character string into the mesh segments, so that the method is robust against partial modification of the 3D mesh model such as division, cutting, copy and paste, and the like.

Figure 4:
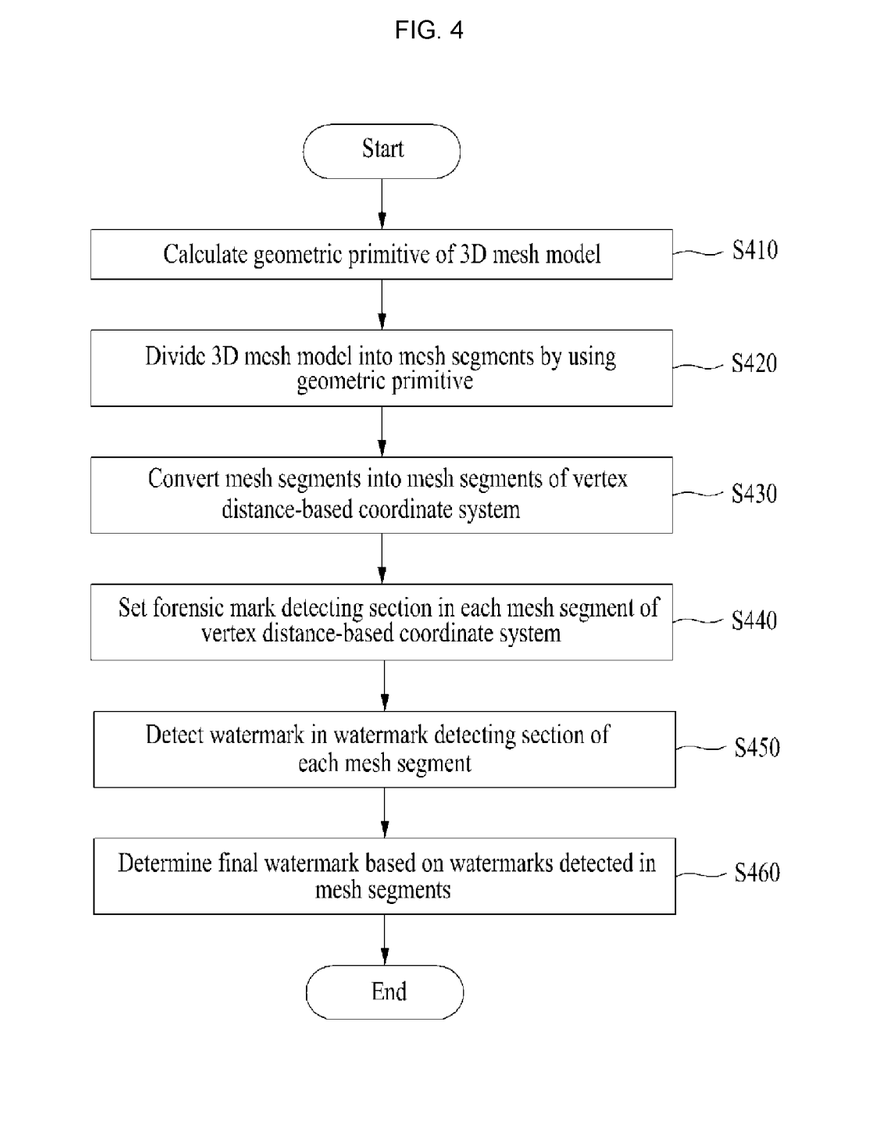
FIG. 4 is a flowchart illustrating a method of detecting a 3D mesh model watermark according to an embodiment of the inventive concept.

FIG. 4 is a flowchart illustrating a method of detecting a 3D mesh model watermark according to an embodiment of the inventive concept.

Referring to FIG. 4, in steps S410 and S420, a method of detecting a watermark according to an embodiment of the inventive concept calculates a geometric primitive of a 3D mesh model of which a watermark is to be detected, and divides the 3D mesh model into a plurality of mesh segments by using the calculated geometric primitive.

In step S410, as the geometric primitive, a shape diameter value of the triangular face of the 3D mesh model may be used. In step S420, after the geometric primitive is calculated, a Gaussian mixture model of the clustering methods may be used to divide the 3D mesh model into the mesh segments.

Furthermore, in the embodiment, to divide the 3D mesh model into the mesh segments, a geometric primitive, which may be calculated at every point or face of a mesh, may be used.

The geometric primitive used in step S410 may include at least one of several types of planarities, similarity with main figures such as a sphere, a cylinder, or a cone, a degree of a variation of a dihedral angle or a normal vector, a curvature, symmetry (slippage) to a rotational movement or a location movement, a geodesic distance on a curved surface, symmetry between meshes, convexity, a central axis, and a motional property of mesh animation.

In step S420, a region growing algorithm, a hierarchical clustering algorithm, an iterative clustering algorithm, a spectral analysis algorithm, a boundary line setting algorithm, a top-down method, an induction algorithm, etc., may be used to divide the 3D mesh model into the mesh segments by using the calculated geometric primitive.

In steps 430 and 440, when the 3D mesh model is divided into the mesh segments in step S420, the mesh segments are converted into mesh segments of the vertex distance-based coordinate system, respectively and a watermark detecting section is set in each of the mesh segments of the vertex distance-based coordinate system to detect watermark therein.

In this case, the watermark detecting section having a predetermined interval may be set by histrogramming each of the mesh segments in step S440. The watermark detecting section is equal to the preset watermark inserting section, where each detecting section may be normalized.

In steps S450 and S460, when each of the watermark detecting sections for the mesh segments is set in step S440, the watermark is detected in the watermark detecting section set in each of the mesh segments and a final watermark is determined based on the watermarks detected in the watermark detecting sections of the mesh segments.

In step S450, an average value of each of the watermark detecting sections of the mesh segments is calculated. If the average value is equal to or greater than 0.5, the first character of the watermark character string is detected. If the average value is less than 0.5, the second character of the watermark character string is detected. That is, in step S450, the watermark character string is detected in the watermark detecting sections set in each of the mesh segments.

Furthermore, according to an embodiment of the inventive concept, when a specific statistic value among section statistic values including an average, variance, a standard deviation, a gradient, a covariance, a correlation coefficient, etc. of each section, may be used to insert the watermark, the corresponding statistic value is used to detect the watermark. For example, when the variance is used as the statistic value to insert the watermark and the range of 'r' of each section is normalized into [−1, 1], if the variance of each section is greater or less than ⅓, the watermark may be detected.

When the watermark is detected, if each section statistic value is greater than that in inserting the watermark, the first character of the watermark character string may be detected. If each section statistic value is less than that in inserting the watermark, the second character of the watermark character string may be detected.

Step S460, which is a step of determining the final watermark inserted into the 3D mesh model among the watermarks detected in step S450, may be performed through a majority voting system or a watermark trace analysis method.

The final watermark inserted into the 3D mesh model may be determined based on the watermarks detected in step S450 by using the majority voting system. The majority voting system may be expressed as following Equation 5.

$$e_1 = \text{sign}\left(\sum_{l=1}^{L} w_l\right)$$ [Equation 5]

$$e_2 = \text{argmin}_{w_j} BER(e_1, w_j)$$

$$e_3 = \text{argmin}_{w_j} \sum_{l=1}^{L} BER(w_l, w_j)$$

$$e_4 = \text{sign}(e_1 + e_2 + e_3)$$

Wherein $\omega_l$ represents a watermark character string detected in the l-th mesh segment, $e_4$ is a determined final watermark character string, BER (Bit Error Rate) is a calculation value obtained by comparing characters (bits) of two character strings with each other, for example, "the number of error bits/the number of total bits".

The final watermark, which is detected by using the watermarks obtained from the mesh segments, may be expressed as following Equation 6.

$$e_{final} = \text{argmax}_e Pr(e|\omega_1, \omega_2, \ldots, \omega_L)$$ [Equation 6]

As known through Equation 6, step S460 is a step of detecting one having the greatest possibility that it is the original watermark among the watermarks when a watermark of each mesh segment is given, which may be implemented through various schemes. For example, step S460 of determining the final watermark may be performed by using at least one of a watermark detected in the greatest mesh segment, a determining method using a representative value such as an average value of the watermark detected in each mesh segment, a mechanical learning method of setting up a stochastic model and determining, and all stochastic and statistical estimation methods.

The final watermark inserted into the 3D mesh model may be determined based on the watermarks detected in step S450 by using the watermark trace analysis method.

After 'r' of each mesh segment is histogrammed, a section function of the section corresponding to the watermark inserting section may be estimated through nonlinear least squares fitting as following Equation 7.

$$Y = X^k$$ [Equation 7]

Wherein 'X' represents a set of vertices included in each section, and 'Y' represents a real value of 'X'. When an initial value of 'k' of each section into which any watermarks are not inserted is '1' and a difference value between a value of 'k' of the estimated section function and the initial value of is greater than a predefined threshold, the section is determined as a watermark trace section. The total of a watermark trace section every 3D mesh segment is calculated. A watermark of a 3D mesh segment of which the total of the watermark trace section is the maximum is determined as the final watermark.

In addition, according to an embodiment of the inventive concept, as a reference for determining the watermark trace section, a statistic value such as an average, variance, a standard deviation, a gradient, a covariance, a correlation coefficient, etc. of each section in every 3D mesh segment, may be used. When a difference between the initial value of the statistic value before the insertion of the watermark and the statistic value after the insertion of the watermark is greater than a predefined threshold, the section is determined as the watermark trace section. The total of the watermark trace section every 3D mesh segment is calculated and the watermark of the 3D mesh segment of which the total of the watermark trace section is the maximum is determined as the final watermark.

As described above, the 3D mesh model watermark detecting method according to the embodiment of the inventive concept detects the watermark character string inserted into each of the mesh segments by dividing the 3D mesh model into the plurality of mesh segments and converting the mesh segments to mesh segments of the vertex distance-based coordinate system in order to detect the watermark inserted into the mesh segments, and detects the final watermark using it, so that the method is robust against typical geometric transformation such as a movement, a scaling, a rotation, and the like, connection information conversion such as mesh order sorting, and may easily detect the inserted watermark even in movement or change of a central point such as division, cutting, copy and paste, and the like.

Figure 5:
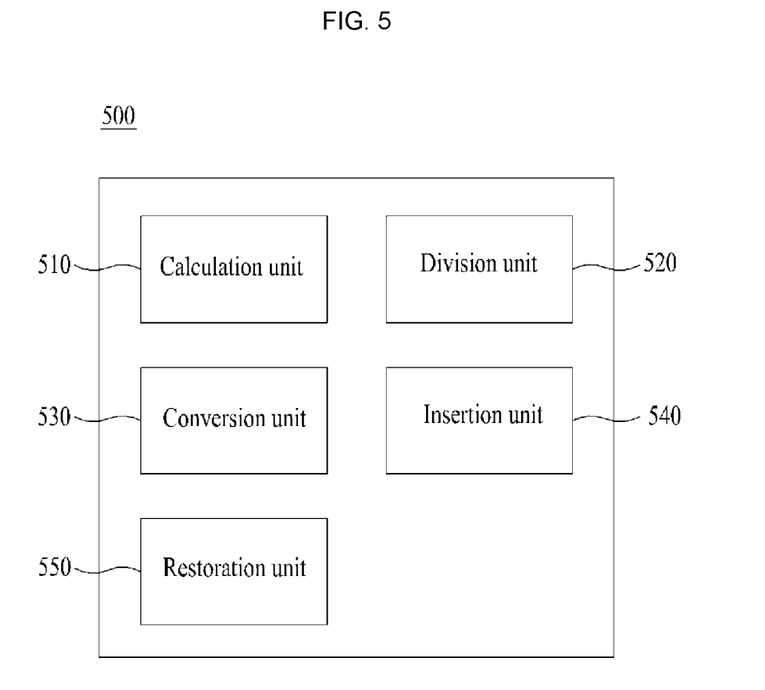
FIG. 5 is a block diagram illustrating a configuration of an apparatus for inserting a 3D mesh model watermark according to an embodiment of the inventive concept.

FIG. 5 is a block diagram illustrating a configuration of an apparatus for inserting a 3D mesh model watermark according to an embodiment of the inventive concept. FIG. 5 illustrates the configuration of an apparatus for performing the watermark inserting method described above.

Referring to FIG. 5, a 3D mesh model watermark inserting apparatus 500 according to an embodiment of the inventive concept includes a calculation unit 510, a division unit 520, a conversion unit 530, an insertion unit 540, and a restoration unit 550.

The calculation unit 510 calculates a geometric primitive of a 3D mesh model for the purpose of division.

In this case, the calculation unit 510 may calculate a shape diameter value of a triangular face of the 3D mesh model to be used as the geometric primitive.

The calculation unit 510 may use geometric primitives, which is calculated every point or face of a mesh, in order to divide the 3D mesh model into the mesh segments. The geometric primitive may include at least one of several types of planarities, similarity with main figures such as a sphere, a cylinder, or a cone, a degree of a variation of a dihedral angle or a normal vector, a curvature, symmetry (slippage) to a rotational movement or a location movement, a geodesic distance on a curved surface, symmetry between meshes, convexity, a central axis, and a motional property of mesh animation.

The division unit 520 divides the 3D mesh model into a plurality of mesh segments by using the geometric primitive.

In this case, the division unit 520 may divide the 3D mesh model into the mesh segments by using a clustering method after calculating the geometric primitive.

In this case, to divide the 3D mesh model into a plurality of mesh segments by using the calculated geometric primitive, the division unit 520 may use a region growing algorithm, a hierarchical clustering algorithm, an iterative clustering algorithm, a spectral analysis algorithm, a boundary line setting algorithm, a top-down method, an induction algorithm, etc.

The conversion unit 530 converts the mesh segments into mesh segments of the vertex distance-based coordinate system.

That is, the conversion unit 530 transforms the mesh segments from the Cartesian coordinate system to the vertex distance-based coordinate system.

The insertion unit 540 inserts a watermark into each of the mesh segments of the vertex distance-based coordinate system.

In this case, the insertion unit 540 sets a watermark inserting section in each of the mesh segments of the vertex distance-based coordinate system, and inserts the watermark into the watermark inserting section set in each of the mesh segments of the vertex distance-based coordinate system.

The insertion unit 540 may set the watermark inserting sections of a predetermined interval by histogramming each of the mesh segments. The insertion unit 540 may insert one character of a watermark character string to be inserted into the set watermark inserting sections, respectively.

Thus, the insertion unit 540 inserts the same watermark character string into each of the mesh segments.

The restoration unit 550 restores the mesh segments into which the watermarks are inserted from the vertex distance-based coordinate system to the Cartesian coordinate system.

Figure 6:
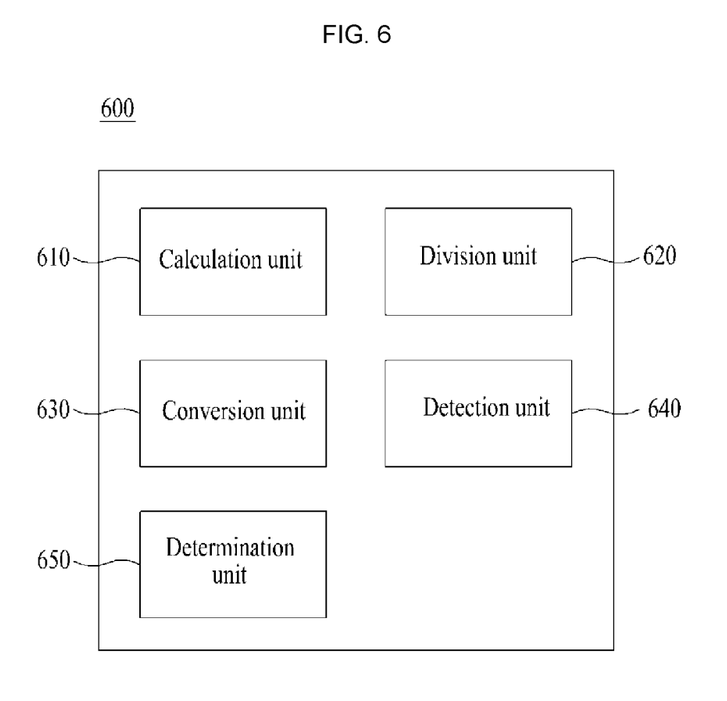
FIG. 6 is a block diagram illustrating a configuration of an apparatus for detecting a 3D mesh model watermark according to an embodiment of the inventive concept.

FIG. 6 is a block diagram illustrating a configuration of an apparatus for detecting a 3D mesh model watermark according to an embodiment of the inventive concept. FIG. 6 illustrates the configuration of an apparatus for performing the watermark detecting method described above.

Referring to FIG. 6, a 3D mesh model watermark detecting apparatus 600 according to an embodiment of the inventive concept includes a calculation unit 610, a division unit 620, a conversion unit 630, a detection unit 640, and a determination unit 650.

The calculation unit 610 calculates a geometric primitive of a 3D mesh model to divide the 3D mesh model.

In this case, the calculation unit 610 may calculate a shape diameter value of a triangular face of the 3D mesh model, which is to be used as the geometric primitive.

In this case, the calculation unit 610 may use geometric primitives which is calculated every point or face of a mesh in order to divide the 3D mesh model into the mesh segments. The geometric primitive may include at least one of several types of planarities, similarity with main figures such as a sphere, a cylinder, or a cone, a degree of a variation of a dihedral angle or a normal vector, a curvature, symmetry (slippage) to a rotational movement or a location movement, a geodesic distance on a curved surface, symmetry between meshes, convexity, a central axis, and a motional property of mesh animation.

The division unit 620 divides the 3D mesh model into a plurality of mesh segments by using the geometric primitive.

In this case, the division unit 620 may divide the 3D mesh model into the mesh segments by using the clustering method after calculating the geometric primitive.

In this case, to divide the 3D mesh model into a plurality of mesh segments using the calculated geometric primitives, the division unit 620 may use a region growing algorithm, a hierarchical clustering algorithm, an iterative clustering algorithm, a spectral analysis algorithm, a boundary line setting algorithm, a top-down method, an induction algorithm, etc.

The conversion unit 630 converts the divided mesh segments into mesh segments of the vertex distance-based coordinate system.

That is, the conversion unit 630 transforms the divided mesh segments from the Cartesian coordinate system to the vertex distance-based coordinate system.

The detection unit 640 detects a watermark in each of the mesh segments of the vertex distance-based coordinate system.

In this case, the detection unit 640 sets a watermark detecting section to detect the watermark in each of the mesh segments of the vertex distance-based coordinate system, and detects the watermark in the watermark detecting section set in each of the mesh segments.

The detection unit 640 may set the watermark detecting sections of a predetermined interval by histogramming each of the mesh segments.

The determination unit 650 determines a final watermark based on the watermarks detected in the mesh segments.

In this case, the determination unit 650 calculates an average value of each of the watermark detecting sections of the mesh segments. If the average value is equal to or greater than 0.5, the first character may be detected in the watermark character string. If the average value is less than 0.5, the second character may be detected in the watermark character string. That is, the determination unit 650 detects the watermark character string in the watermark detecting sections set in each of the mesh segments.

In this case, when a specific statistic value selected from section statistic values, which include an average, variance, a standard deviation, a gradient, a covariance, a correlation coefficient, etc. of each section, is used to insert the watermark, the determination unit 650 may use the corresponding statistic value for each of the watermark detection sections set in the mesh segments. That is, when the watermark is detected, if the statistic value of each section is greater than that when the watermark is inserted, the first character may be detected in the watermark character string. If the statistic value is less than that when the watermark is inserted, the second character may be detected in the watermark character string.

The determination unit 650 determines a final watermark inserted into the 3D mesh model based on the watermark detected in each of the mesh segments.

In this case, the determination unit 650 may determine the final watermark inserted into the 3D mesh model based on the watermarks detected in the mesh segments by using a majority voting system.

Alternatively, the determination unit 650 may determine the final watermark inserted into the 3D mesh model based on the watermarks detected in the mesh segments by using a watermark trace analysis method.

The foregoing systems or devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. In addition, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to the embodiments of the inventive concept, the 3D mesh model may be divided to insert and detect a watermark. In detail, a watermark robust against partial modification of a 3D mesh model such as division, cutting, copy and paste, and the like may be inserted and detected.

In more detail, according to the embodiments of the inventive concept, the method and apparatus may be robust against typical geometric transformation such as a movement, a scaling, a rotation, and the like, and connection information conversion such as mesh order sorting, and may make good performance even in movement or change of a central point such as division, cutting, copy and paste, and the like.

According to the embodiments of the inventive concept, the watermark may be detected without an original work, so that the copyright of a 3D printed drawing is effectively protected.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

What is claimed is:

1. A method of inserting a watermark into a three-dimensional (3D) mesh model, the method comprising:
    calculating a geometric primitive of the 3D mesh model, the geometric primitive comprising a degree of similarity to a shape selected from a group consisting of a sphere, cylinder, or cone;
    dividing the 3D mesh model into a plurality of mesh segments by using the geometric primitive, wherein the dividing of the 3D mesh model comprises dividing the 3D mesh model into the mesh segments by clustering according to similarity of the geometric primitive;
    converting the mesh segments into mesh segments of a vertex distance-based coordinate system, the distance-based coordinate system being a cylindrical coordinate system;
    inserting the watermark into each of the mesh segments of the vertex distance-based coordinate system; and
    restoring the mesh segments into which the watermark is inserted to a Cartesian coordinate system.

2. The method of claim 1, wherein the inserting of the watermark comprises:
    setting a watermark inserting section in each of the mesh segments of the vertex distance-based coordinate system; and
    inserting the watermark into the watermark inserting section set in each of the mesh segments of the vertex distance-based coordinate system.

3. The method of claim 2, wherein the setting of the watermark inserting section comprises setting the watermark inserting section of a predetermined interval by histogramming each of the mesh segments.

4. A method of detecting a watermark in a three-dimensional (3D) mesh model, the method comprising:
    calculating a geometric primitive of the 3D mesh model, the geometric primitive comprising a degree of similarity to a shape selected from a group consisting of a sphere, cylinder, or cone;
    dividing the 3D mesh model into a plurality of mesh segments by using the geometric primitive, wherein the dividing of the 3D mesh model comprises dividing the 3D mesh model into the mesh segments by clustering according to similarity of the geometric primitive;
    converting the mesh segments into mesh segments of a vertex distance-based coordinate system;
    detecting the watermark in each of the mesh segments of the vertex distance-based coordinate system; and
    determining a final watermark based on the watermark detected in each of the mesh segments by watermark trace analysis, wherein watermark trace analysis comprises determining a statistical value for each of the mesh segments.

5. The method of claim 4, wherein the detecting of the watermark comprises:
    setting a watermark detecting section in each of the mesh segments of the vertex distance-based coordinate system; and
    detecting the watermark in the watermark detecting section set in each of the mesh segments of the vertex distance-based coordinate system.

6. The method of claim 5, wherein the setting of the watermark detecting section comprises setting the watermark detecting section of a predetermined interval by histogramming each of the mesh segments.

7. An apparatus for inserting a watermark into a three-dimensional (3D) mesh model, the apparatus comprising:
    a calculation unit configured to calculate a geometric primitive of the 3D mesh model, the geometric primitive comprising a similarity to a shape selected from a group consisting of a sphere, cylinder, or cone;

a division unit configured to divide the 3D mesh model into a plurality of mesh segments by using the geometric primitive, wherein the division unit divides the 3D mesh model into the mesh segments by clustering according to similarity of the geometric primitive;

a conversion unit configured to convert the mesh segments into mesh segments of a vertex distance-based coordinate system, the distance-based coordinate system being a cylindrical coordinate system;

an insertion unit configured to insert the watermark into each of the mesh segments of the vertex distance-based coordinate system; and a restoration unit configured to restore the mesh segments into which the watermark is inserted to a Cartesian coordinate system.

8. The apparatus of claim 7, wherein the insertion unit sets a watermark inserting section in each of the mesh segments of the vertex distance-based coordinate system, and inserts the watermark into the watermark inserting section set in each of the mesh segments of the vertex distance-based coordinate system.

9. The apparatus of claim 8, wherein the insertion unit sets the watermark inserting section of a predetermined interval by histogramming each of the mesh segments.

10. An apparatus for detecting a watermark in a three-dimensional (3D) mesh model, the apparatus comprising:

a calculation unit configured to calculate a geometric primitive of the 3D mesh model, the geometric primitive comprising a similarity to a shape selected from a group consisting of a sphere, cylinder, or cone;

a division unit configured to divide the 3D mesh model into a plurality of mesh segments by using the geometric primitive, wherein the division unit divides the 3D mesh model into the mesh segments by clustering according to similarity of the geometric primitive;

a conversion unit configured to convert the mesh segments into mesh segments of a vertex distance-based coordinate system;

a detection unit configured to detect the watermark in each of the mesh segments of the vertex distance-based coordinate system; and a determination unit configured to determine a final watermark based on the watermark detected in each of the mesh segments by watermark trace analysis, wherein watermark trace analysis comprises determining a statistical value for each of the mesh segments.

11. The apparatus of claim 10, wherein the detection unit sets a watermark detecting section in each of the mesh segments of the vertex distance-based coordinate system, and detects the watermark in the watermark detecting section of each of the mesh segments of the vertex distance-based coordinate system.

12. The apparatus of claim 11, wherein the detection unit sets the watermark detecting section of a predetermined interval by histogramming each of the mesh segments.

* * * * *